(12) United States Patent  
Irving et al.

(10) Patent No.: US 8,838,622 B2  
(45) Date of Patent: Sep. 16, 2014

(54) METHOD AND SYSTEM FOR MONITORING AND FILTERING DATA TRANSMISSION

(75) Inventors: John Irving, Ottawa (CA); Marcello Bursztein, Ottawa (CA); Steve Mulligan, Ottawa (CA); Patrick Lajeunesse, Ottawa (CA)

(73) Assignee: Cricket Media, Inc., Herndon, VA (US)

( * ) Notice: Subject to any disclaimer, the term of this patent is extended or adjusted under 35 U.S.C. 154(b) by 657 days.

(21) Appl. No.: 10/619,259

(22) Filed: Jul. 14, 2003

(65) Prior Publication Data

US 2004/0103137 A1     May 27, 2004

Related U.S. Application Data

(60) Provisional application No. 60/395,409, filed on Jul. 13, 2002.

(51) Int. Cl.
|  |  |
|---|---|
| *G06F 17/00* | (2006.01) |
| *G06F 17/30* | (2006.01) |
| *G09B 5/00* | (2006.01) |
| *G09B 7/00* | (2006.01) |

(52) U.S. Cl.
CPC ... *G09B 7/00* (2013.01); *G09B 5/00* (2013.01)
USPC ...................................................... 707/754

(58) Field of Classification Search
USPC .............. 434/350; 709/203, 204; 710/100; 707/608, 999.107, 690, 754; 705/319, 705/326

See application file for complete search history.

(56) References Cited

U.S. PATENT DOCUMENTS

| 4,740,912 A | 4/1988 | Whitaker |
| 5,710,884 A | 1/1998 | Dedrick |
| 5,740,549 A | 4/1998 | Reilly et al. |

(Continued)

FOREIGN PATENT DOCUMENTS

| FR | 2814844 A1 | 10/2000 |
| WO | 2007118231 | 10/2007 |

OTHER PUBLICATIONS

United States Patent and Trademark Office, Non-Final Office Action, mailed Mar. 2, 2012, U.S. Appl. No. 13/251,263, filed Oct. 2, 2011, Linda T. Dozier et al.

(Continued)

*Primary Examiner* — Marc Filipczyk
(74) *Attorney, Agent, or Firm* — Nelson Mullins Riley & Scarborough LLP

(57) ABSTRACT

The present invention is a method and apparatus for monitoring and filtering data transmission for providing the creation of a secure "virtual classroom" through which teachers can use the internet to link their students to other classes and work collaboratively and create a "shared learning" environment. A collaborative community is created by a teacher or administrator who submits initial input data to a central storage and clearing center. A first filter system is employed to ascertain and control the entrance of class data in order to ensure that the entering party is duly authorized. Once the initial input data is accepted, a search engine permits the teacher to search for compatible shared classrooms. The dynamic filtering permits security to be controlled by a central location and ties the individual classrooms into a network. The dynamic filtering level component permits each classroom and each student to be monitored to a degree designated by the teacher and appropriate for the student. A flagging filter component scans all incoming and outgoing messages to permit review prior to release.

26 Claims, 1 Drawing Sheet

(56) References Cited

U.S. PATENT DOCUMENTS

| | | |
|---|---|---|
| 5,761,662 A | 6/1998 | Dasan |
| 5,768,528 A | 6/1998 | Stumm |
| 5,772,446 A | 6/1998 | Rosen |
| 5,813,863 A | 9/1998 | Sloane et al. |
| 5,907,831 A | 5/1999 | Lotvin et al. |
| 5,933,498 A | 8/1999 | Schneck et al. |
| 5,970,231 A | 10/1999 | Crandall |
| 5,972,875 A | 10/1999 | Crutcher et al. |
| 5,974,446 A | 10/1999 | Sonnenreich et al. |
| 5,987,606 A | 11/1999 | Cirasole et al. |
| 6,020,884 A | 2/2000 | MacNaughton et al. |
| 6,075,968 A | 6/2000 | Morris et al. |
| 6,085,229 A | 7/2000 | Newman et al. |
| 6,105,027 A | 8/2000 | Schneider et al. |
| 6,157,924 A | 12/2000 | Austin |
| 6,178,407 B1 | 1/2001 | Lotvin et al. |
| 6,208,995 B1 | 3/2001 | Himmel et al. |
| 6,233,618 B1 | 5/2001 | Shannon |
| 6,249,282 B1 | 6/2001 | Sutcliffe et al. |
| 6,279,013 B1 | 8/2001 | LaMarca et al. |
| 6,296,487 B1 | 10/2001 | Lotecka |
| 6,302,698 B1 | 10/2001 | Ziv-El |
| 6,324,538 B1 | 11/2001 | Wesinger, Jr. et al. |
| 6,341,960 B1 | 1/2002 | Frasson et al. |
| 6,363,062 B1 | 3/2002 | Aaronson et al. |
| 6,370,355 B1 | 4/2002 | Ceretta et al. |
| 6,374,237 B1 | 4/2002 | Reese |
| 6,381,444 B1* | 4/2002 | Aggarwal et al. ............ 434/350 |
| 6,401,075 B1 | 6/2002 | Mason et al. |
| 6,438,632 B1* | 8/2002 | Kikugawa ..................... 710/100 |
| 6,460,036 B1 | 10/2002 | Herz |
| 6,470,353 B1 | 10/2002 | Yaung et al. |
| 6,480,885 B1 | 11/2002 | Olivier |
| 6,554,618 B1 | 4/2003 | Lockwood |
| 6,560,578 B2 | 5/2003 | Eldering |
| 6,606,479 B2 | 8/2003 | Cook et al. |
| 6,633,855 B1* | 10/2003 | Auvenshine ..................... 706/15 |
| 6,658,415 B1 | 12/2003 | Brown et al. |
| 6,684,212 B1 | 1/2004 | Day et al. |
| 6,691,106 B1 | 2/2004 | Sathyanarayan |
| 6,691,153 B1 | 2/2004 | Hanson et al. |
| 6,704,320 B1 | 3/2004 | Narvaez et al. |
| 6,718,369 B1 | 4/2004 | Dutta |
| 6,725,203 B1 | 4/2004 | Seet et al. |
| 6,741,980 B1 | 5/2004 | Langseth et al. |
| 6,757,691 B1 | 6/2004 | Welsh et al. |
| 6,766,362 B1 | 7/2004 | Miyasaka et al. |
| 6,807,558 B1 | 10/2004 | Hassett et al. |
| 6,825,945 B1 | 11/2004 | Silverbrook et al. |
| 6,826,534 B1 | 11/2004 | Gupta et al. |
| 6,842,773 B1 | 1/2005 | Ralston et al. |
| 6,845,273 B1 | 1/2005 | Taylor |
| 6,892,226 B1 | 5/2005 | Tso et al. |
| 6,920,617 B2 | 7/2005 | Nitta |
| 6,954,783 B1 | 10/2005 | Bodwell et al. |
| 6,973,462 B2 | 12/2005 | Dattero et al. |
| 6,988,839 B1 | 1/2006 | Yu |
| 7,031,651 B2 | 4/2006 | McCormick et al. |
| 7,032,022 B1 | 4/2006 | Shanumgam et al. |
| 7,035,926 B1 | 4/2006 | Cohen et al. |
| 7,120,590 B1 | 10/2006 | Eisen et al. |
| 7,127,741 B2 | 10/2006 | Bandini et al. |
| 7,162,522 B2 | 1/2007 | Adar et al. |
| 7,328,216 B2 | 2/2008 | Hofmann et al. |
| 7,464,147 B1 | 12/2008 | Fakhouri et al. |
| 7,577,665 B2 | 8/2009 | Ramer et al. |
| 7,640,336 B1 | 12/2009 | Lu et al. |
| 7,765,481 B2 | 7/2010 | Dixon et al. |
| 2001/0037407 A1 | 11/2001 | Dragulev et al. |
| 2002/0013836 A1 | 1/2002 | Friedman et al. |
| 2002/0038246 A1 | 3/2002 | Nagaishi |
| 2002/0040374 A1 | 4/2002 | Kent |
| 2002/0049806 A1 | 4/2002 | Gatz et al. |
| 2002/0064767 A1 | 5/2002 | McCormick et al. |
| 2002/0100808 A1 | 8/2002 | Norwood et al. |
| 2002/0119434 A1 | 8/2002 | Beams et al. |
| 2002/0123334 A1 | 9/2002 | Borger et al. |
| 2002/0140732 A1 | 10/2002 | Tveskov |
| 2002/0161770 A1 | 10/2002 | Shapiro et al. |
| 2002/0168621 A1 | 11/2002 | Cook et al. |
| 2002/0169782 A1 | 11/2002 | Lehmann et al. |
| 2002/0169954 A1 | 11/2002 | Bandini et al. |
| 2002/0174230 A1 | 11/2002 | Gudorf et al. |
| 2002/0184092 A1 | 12/2002 | Cherry et al. |
| 2003/0029911 A1 | 2/2003 | Kitayama |
| 2003/0050986 A1 | 3/2003 | Matthews et al. |
| 2003/0093518 A1* | 5/2003 | Hiraga ........................... 709/224 |
| 2003/0110215 A1* | 6/2003 | Joao ............................... 709/203 |
| 2003/0164849 A1 | 9/2003 | Barrie et al. |
| 2003/0207245 A1 | 11/2003 | Parker |
| 2004/0001087 A1 | 1/2004 | Warmus et al. |
| 2004/0014017 A1 | 1/2004 | Lo |
| 2004/0030781 A1 | 2/2004 | Etesse et al. |
| 2004/0039814 A1 | 2/2004 | Crabtree et al. |
| 2004/0049554 A1 | 3/2004 | Watanabe |
| 2004/0064515 A1 | 4/2004 | Hockey |
| 2004/0103118 A1 | 5/2004 | Irving et al. |
| 2004/0103122 A1 | 5/2004 | Irving et al. |
| 2004/0103137 A1 | 5/2004 | Irving et al. |
| 2004/0111423 A1 | 6/2004 | Irving et al. |
| 2004/0122692 A1 | 6/2004 | Irving et al. |
| 2004/0128624 A1 | 7/2004 | Arellano et al. |
| 2004/0145770 A1 | 7/2004 | Nakano et al. |
| 2004/0167794 A1 | 8/2004 | Shostack |
| 2004/0186738 A1 | 9/2004 | Reisman |
| 2004/0205578 A1 | 10/2004 | Wolff et al. |
| 2005/0014121 A1 | 1/2005 | Eck et al. |
| 2005/0014122 A1 | 1/2005 | Ruvinsky et al. |
| 2005/0033657 A1 | 2/2005 | Herrington et al. |
| 2005/0071328 A1 | 3/2005 | Lawrence |
| 2005/0079477 A1 | 4/2005 | Diesel et al. |
| 2005/0105134 A1 | 5/2005 | Moneypenny et al. |
| 2005/0165743 A1 | 7/2005 | Bharat et al. |
| 2005/0166143 A1 | 7/2005 | Howell |
| 2005/0216336 A1 | 9/2005 | Roberts et al. |
| 2005/0227216 A1 | 10/2005 | Gupta |
| 2005/0240580 A1 | 10/2005 | Zamir et al. |
| 2005/0251494 A1 | 11/2005 | Maria Jansen |
| 2005/0266388 A1 | 12/2005 | Gross et al. |
| 2005/0288943 A1 | 12/2005 | Wei et al. |
| 2006/0031087 A1 | 2/2006 | Fox et al. |
| 2006/0062157 A1 | 3/2006 | Yamamoto |
| 2006/0115800 A1 | 6/2006 | Daley |
| 2006/0134593 A1 | 6/2006 | Kalous et al. |
| 2006/0240856 A1 | 10/2006 | Counts et al. |
| 2006/0242234 A1 | 10/2006 | Counts et al. |
| 2006/0246197 A1 | 11/2006 | Kshirsagar et al. |
| 2006/0248197 A1 | 11/2006 | Evans et al. |
| 2006/0252547 A1* | 11/2006 | Mizrahi et al. .................. 463/42 |
| 2006/0253533 A1 | 11/2006 | Bursztein et al. |
| 2006/0253572 A1 | 11/2006 | Gomez et al. |
| 2007/0027973 A1 | 2/2007 | Stein et al. |
| 2007/0130339 A1 | 6/2007 | Alcorn et al. |
| 2007/0224585 A1 | 9/2007 | Gerteis et al. |
| 2007/0231782 A1 | 10/2007 | Ozawa et al. |
| 2007/0245349 A1* | 10/2007 | Sinn ............................... 718/100 |
| 2007/0260671 A1 | 11/2007 | Harinstein et al. |
| 2008/0082480 A1 | 4/2008 | Gounares et al. |
| 2008/0126476 A1 | 5/2008 | Nicholas et al. |
| 2009/0030876 A1 | 1/2009 | Hamilton |

OTHER PUBLICATIONS

United States Patent and Trademark Office, Non-Final Office Action, mailed Apr. 17, 2012, U.S. Appl. No. 11/402,830, filed Apr. 13, 2006, Osmani Gomez et al.

United States Patent and Trademark Office, Non-Final Office Action, mailed Mar. 30, 2012, U.S. Appl. No. 12/105,254, filed Apr. 17, 2008, John Irving et al.

Ashley Lowery, Internet Neighborhood ePALS links world with Edwardsburg, South Bend Tribune, Mar. 14, 2001.

ePALS Classroom Exchange First to Provide Teacher Monitored Email With Instant Language Translations, PR Newswire, Mar. 14, 2000.

(56) References Cited

OTHER PUBLICATIONS ePALS Classroom Exchange partners with Canada's SchoolNet, Canada NewsWire, Nov. 23, 2000.
MessageLabs: British Government Takes on MessageLabs to Bolster Virus Protection, M2 Presswire, May 16, 2002.
Netopia: Netopia to bring parental control, content filtering and family security services to broadband service providers, M2 Presswire, Jun. 4, 2002.
Portions of http://www.ecs.syr.edu/organizations/AEW/ website and associated Internet Archive information.
Safety: Monitoring web access, The Guardian, Oct. 25, 2000, at 7.
Scholastic and ePALS Classroom Exchange Announce Agreement Connecting Global Classrooms, Business Wire, Aug. 10, 2000.
Zoraini Wati Abas, E-mail activities in the classroom, Computimes Malaysia, Apr. 26, 2001.
Portions of the file history of U.S. Appl. No. 10/619,097.
Portions of the file history of U.S. Appl. No. 10/619,098.
Portions of the file history of U.S. Appl. No. 10/619,099.
Portions of the file history of U.S. Appl. No. 10/619,101.
Portions of the file history of U.S. Appl. No. 12/105,254.
United States Patent and Trademark Office, Final Office Action issued May 7, 2014 in U.S. Appl. No. 10/619,099, filed Jul. 14, 2003, John Irving, et al.
United States Patent and Trademark Office, Final Office Action issued May 8, 2014 in U.S. Appl. No. 10/619,097, filed Jul. 14, 2003, John Irving, et al.
Ormes, S., "An Introduction to Filtering," 2002, www.archive.org, printed Jan. 6, 2014.
Rit, "The Economic Impact of Role-Based Access Control," 2002, National Institute of Standards and Technology.
United States Patent and Trademark Office, Non-Final Office Action, mailed Aug. 7, 2013, U.S. Appl. No. 12/105,254, filed Apr. 17, 2008, John Irving et al.
Response to Non-Final Office Action dated Aug. 7, 2013 in U.S. Appl. No. 12/105,254, filed Apr. 17, 2008, John Irving et al.
Final Office Action dated Apr. 9, 2014 in U.S. Appl. No. 12/105,254, filed Apr. 17, 2008, John Irving et al.

* cited by examiner

METHOD AND SYSTEM FOR MONITORING AND FILTERING DATA TRANSMISSION

CROSS-REFERENCE TO RELATED APPLICATIONS

This application claims the priority date of Jul. 13, 2002, based upon the filing of Provisional application Ser. No. 60/395,409.

BACKGROUND OF THE INVENTION

Over the past 20 years, the Internet has moved from being a pioneering link between universities and colleges to an integral part of everyday life, both within the home and outside. The ability to link people electronically has allowed remote parts of the world to share information and communication in real time. Access to the Internet and information communication technology has refined the way people conduct their day-to-day business and their lives. The ability to communicate over the network (e-mail) and to share information between people thousands of miles apart (chat groups) has permitted collaboration and dissemination of data on a scale never before achieved.

With the surge in connectivity have also come questionable applications of the linkage. Whereas once parents could screen mail delivered to their front door and teachers could exercise some control over the information flow to their students, desktop computers have provided open access to both the home and the school. Regular e-mail and open access chat rooms are generally not secure. Spam is a regular and generally unwanted addition to most e-mail accounts. Although there are some screening tools and blockages, such as Zwallet, Prontomail and JustSafe Filtered Email, that can be employed to try to regain control over the flow of information, and free one class/one teacher services such as Gaggle.net, they are not adequate to the task.

The sharing of information between students in a collaborative environment has been an educational goal since the first teachers promoted the first pen-pals. The greater is the number of participants, the more enriched is the discussion and concomitant learning experience. The creation of a "shared learning" environment and relationships among the participants over the Internet carries with it the need to create a secure "virtual classroom" in which the teacher is still the person responsible for the children's intellectual well-being. This responsibility requires monitoring and filtering of the transmitted information without making the system onerous to either the monitor (teacher) or the students.

SUMMARY OF THE INVENTION

The method and system for monitoring and filtering of electronic data transmission (SafeMail) permits the creation of a secure "virtual classroom" through which teachers can use the Internet to link their students to other classes to work collaboratively and create a "shared learning" environment. A community is formed by having a teacher who is interested in participating in collaborative education submit preliminary educational data to a central digital data storage center. The data generally contains a description of the class, age of the students, language information, number of participants and project interests. A first filter system is employed to ascertain and control the entrance of class data in order to ensure that the entering party (teacher) is actually a teacher and that they are duly authorized to monitor the students. Once a teacher is validated, the class specific material is entered into the community creation database, along with any project specific inquiries. The data is then compiled and stored.

The teacher creates a monitored account for each of the students. Each account is under the control of the teacher for all purposes. The information coming into each account is filtered through a multi-level security filter that defines different levels of control. The teacher can set the control level based upon student related criteria (age, sex, maturity, etc.). This permits the teacher to define the degree of filtration and the degree to which each student is being monitored.

Once the teacher's class is accepted into the data storage system, a search engine permits the teacher to search anywhere within the data storage system's world of classrooms for compatible classrooms. The teacher can, using the search engine, plan collaborative Internet activities in a "shared learning" context. They can permit the students to go "on-line" to link to other classes to work collaboratively to further enrich any topic they are learning. By permitting teachers to create the student accounts, it allows the creation of a large on-line student/teacher community with multiple classrooms.

The dynamic filtering permits security to be controlled from a centralized location and ties the individual classrooms into a network. The filtering level component permits each classroom within the network to be monitored to a degree that is teacher designated and appropriate for the students. The system is designed to permit an accepted teacher to receive a copy of messages that are sent or received in a student's account. The flagging filter component of the system will scan each message sent or received for words that are on a master flagged word list. If a word on the master flagged word list is found in the message, the message is routed to the teacher's account and will not be released until the teacher has reviewed it and authorized its delivery or transmittal.

Another filtering component permits the centralized location to monitor all communications designated for a discussion board before the communication is posted. This dynamic filtering system also can be teacher designated and employs a master flagged word list. However the monitoring function is centralized and the teacher is not burdened with having to review flagged messages for posting. In the event there is a flagged message which is not appropriate for posting, the message is routed to the teacher for appropriate action regarding the originating student.

Another important aspect of the dynamic filtering system is that attachments are also reviewed in order to control any improper transmittal of data to a student. Because attachments can be compressed, encrypted, or in unrecognizable formats, the filtering system flags any attachment to allow the monitor to assess whether it contains inappropriate material.

The centralized filtering system permits coordination of filtration between members in a community, revision by teachers of monitoring criteria and implementation of those revisions, creation of additional accounts for students in order to permit multiple access and different levels of filtration and unique community building within the overall network.

DETAILED DESCRIPTION

Figure 1:
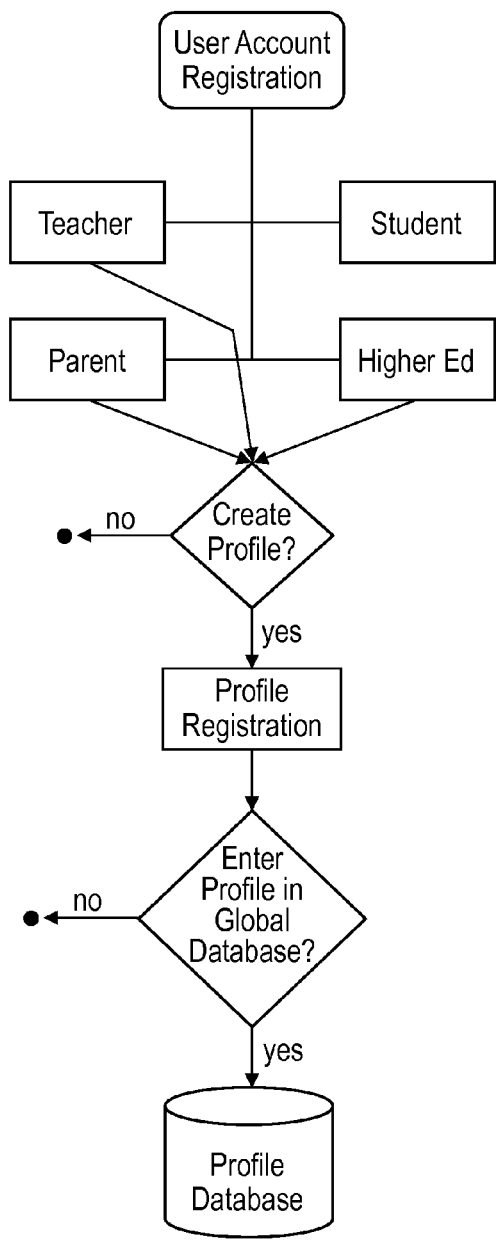
FIG. 1 illustrates a flow diagram of a process according to an embodiment of the invention.
Figure 2:
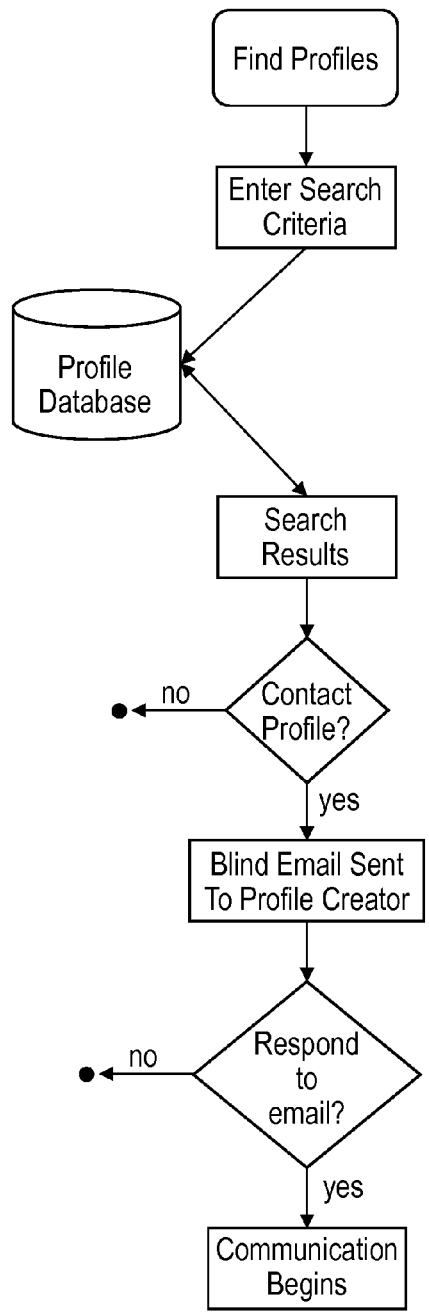
FIG. 2 illustrates a flow diagram of a process according to an embodiment of the invention.

The applications for SafeMail go beyond simple interaction between two individuals or even two groups of individuals. This technology can provide collaboration on projects or the actual creation of multi-national, multi-group interactions with additional information and participation as well as temporal extensions of projects. Educational tools can be proliferated and employed to create "shared learning" and projects can be created by one group or multiple groups to permit peer activities. SafeMail can launch an application which would permit extensions of the project which could be part of the underlying database or could interact to search for similar projects and thus create new entrants into the initial groups. SafeMail can also be employed, through the teacher monitoring, with both time-sensitive and extension of project sensitive information. For example, a project relating to the currencies of nations could be extended by providing time-sensitive data as to activities by central banks and the U.S. Federal Reserve Board which the students could then factor into their projects to see the immediate effects thereof.

SafeMail would always, however, filter the information being received so that there would always be the level of monitoring by the teacher that would keep the interaction safe for the level of student involved. Additionally, where there are multiple levels of student, the filtering can be set by the teachers involved such that upper level students can obtain more varied information with less filtration, while younger students involved in the same project will not necessarily see that same information.

Example 1

The applications for the secure, monitored SafeMail system go beyond the simple transmittal of an e-mail between two students. This system can provide projects for collaborative implementation and modify the project parameters depending on teacher designated criteria, while maintaining the essential filtration and monitoring aspects of the system. The system can record a log of the recipients of the messages and this log can be used to assist the monitor in determining if there may be inappropriate activities being engaged in (e.g. Multiple late night transmittals, storage of large files, etc.).

Example 2

SafeMail can permit an interactive project designed to illustrate the differing values of currency and cost of living in countries around the world. A participant is invited to register for the project, after which they are asked to answer a series of questions about the cost of various products and services in their country. Participants answer in their local currency. In viewing the results, users see the average value entered for participants in each country both in their own currency and in the original currency entered by the user. This permits a true comparison of the prices of the products and services surveyed.

Example 3

The system can be employed in conjunction with a project is designed to allow participating classrooms to compete in a series of physical challenges and compare their results with those of their peers. Results are entered into the project interface, tabulated, and ranked.

Example 4

The system can be used to create, host and moderate an interactive Online Book Club as a resource for the online educational community. This Book Club can provide a focus of discussion for students and teachers around the world on the topics of literature in the classroom and literacy. The system can also provide sponsors with the opportunity to promote their products and authors to teachers and students in an educationally sound and safe manner.

Example 5

The system can be used to permit students and teachers to gain access to experts in various areas and different countries. A project such as "Ask An Expert" is a unique gathering of technology, communication platform, language capability and community that brings experts in various curricula safely into classrooms around the world. This model includes the following elements:
  targeted invitations sent to likely participants in the project;
  custom project information pages
  moderated discussion forum to facilitate communication exchanges
  "expert" participation in the forum Method of Operation A teacher creates a profile of both the class and the users within that class. The profile is globally accessible and is intended to describe a teacher's class and the type of class with whom they may be interested in communicating. The teacher has the option of making the profile public or not.

A submitted profile, either of the teacher, the class or the project participation, is then screened and, if approved, is permitted to go "live" and become part of the global community. In the event that a profile is submitted through a third-party verification source which approves the profile, it can go live immediately upon submission to the community. In the event that the profile is submitted "on-line", it is screened prior to community incorporation to verify that it is a proper part of the community being created. This screen prevents non-teachers from infiltrating the community. It curtails inappropriate, non-teacher generated projects, prevents advertisers or other non-educational entities to get into the community and maintains the "shared learning" environment centered around classroom instruction and teacher monitoring.

The approved profile is assigned to an account which the teacher originator can then permit the students to access through sub-accounts, over which there is filtering and ultimate teacher monitoring. The user, once approved, can create multiple profiles and/or projects as well as multiple filtering levels. Each of the profiles need only contain a subset of the information currently stored in the master class profile. The teacher can also designate that a given search be limited to the community indicated division and below, so as to maintain the relevance of the proposed project to the particular sub-community. If there is no search limitation, the default may be a global search of the entire community to determine the universe of available collaborative entities.

Once a search is completed, the user can contact the identified profiles to establish direct contact and manage the collaboration. The searcher-teacher and the located-teacher can create multiple profiles and projects, extend a particular project, allow students to have access to moderate and modify the profiles as the project develops while at the same time have control over the level and quality, in terms of verbiage, of information that the students exchange. The students are able to write to their counterparts, who become their audience. The exchange of letters and concomitant information while the joint project is in progress will improve writing and stimulate interest in countries and cultures. As a corollary, the students are more likely to view the work less as "home work" or 'school work" and more as an ability to communicate with other people around the world who have both similar and different issues and problems. This will permit an exchange of points of view that is not often possible in the usually insulated environment of a local classroom.

In each instance where the students communicate with one another or transfer information from outside the classroom, the material is centrally filtered to determine whether either the transmitting letter (e-mail) contains language, expressions or words that would be inappropriate for the recipient, or if they contain attachments that may contain inappropriate material. The material is scanned against the master listing and if found to be in question, is flagged and forwarded to the teacher for review. The teacher who has set up the approved account may designate a number of different levels of filtering and monitoring. By way of example only, the teacher can have all communication be referenced to him/her with a flag as to those that are not being delivered directly because of a content question or issue. Alternatively, the teacher can have only flagged communications forwarded. Depending on the filter level that the teacher chooses, various additional activities can also be implemented. All communications from or to a particular account after a flagged message occurs can be referred to the teacher for review. An account that accumulates more than a certain number of flagged messages can be shut down, subject to reactivation by the teacher. An account that is shut down can have messages forwarded and stored pending reactivation of the account, so that there is no loss of information.

Although the above is indicative of the manner in which the filtering and monitor system operates within a controlled educational environment, it can be extended to other similar educational environments. The filter can also be modified and particularized so as to permit it to be highly specialized in its filtering capabilities. This will permit the monitor to refine its characteristics and make it more responsive to any special needs that may be inherent in a particular classroom environment.

We claim:

1. An apparatus for monitored and filtered communication in a shared learning environment, the shared learning environment including a plurality of validated groups that communicate among one another, each of the plurality of validated groups comprising at least one participant, and a person associated with at least one of the validated groups with the associated person having the ability to define the filtration for the participant, the apparatus comprising:
a central data storage center that receives group description data associated with a candidate group and stores the group description data;
a first filter that validates the group description data whereupon the associated candidate group is deemed acceptable for participation in the shared learning environment, wherein the candidate group associated with the validated group description data thereby becomes one of the plurality of validated groups; and
a second filter that monitors and scans communications between the plurality of validated groups, the second filter including at least a flagging filter that is capable of flagging communications between participants in validated groups for further filtration of the content of the flagged communications based, at least in part, on a portion of the group description data and on criteria other than message content and that forwards flagged communications for further inspection based on the filtration defined by the associated person for either the creator of the communication or the viewer of the communication.

2. The apparatus of claim 1, wherein the candidate group comprises a classroom and the at least one participant comprises at least one student, and wherein the group description data includes one or more of an identity of the associated person, a textual description of the classroom, an average age of the at least one student, one or more languages spoken by the at least one student, the number of students comprising the at least one student, and a description of the interests of the at least one student.

3. The apparatus of claim 1, wherein the group description data includes identification information regarding the associated person, and wherein the first filter validates an identity of the associated person.

4. The apparatus of claim 3, wherein validation of the identity of the associated person includes ensuring that the associated person is authorized to represent the participants in the candidate group.

5. The apparatus of claim 1, wherein the flagging filter includes one or more filtering levels at which communications between participants are filtered, and wherein each participant in a validated group is associated with a participant account, the participant account identifying one of the filtering levels at which the flagging filter flags communications associated with a participant associated with the participant account.

6. The apparatus of claim 5, wherein the associated person for each validated group sets the filtering level for each participant account.

7. The apparatus of claim 1, wherein some or all of the group description data is used to create a profile having one or more group characteristics associated with each of the validated groups and wherein a search engine searches for another of the plurality of validated groups based on one or more of the one or more group characteristics.

8. The apparatus of claim 1, further comprising a master word list associated with the flagging filter, wherein the flagging filter scans all communications between participants of validated groups and flags communications that include words on the master word list.

9. The apparatus of claim 8, wherein all flagged communications are sent to the associated person for review prior to the flagged communications reaching their destination.

10. The apparatus of claim 9, wherein the communications are electronic mail messages and the destination is an inbox of a participant.

11. The apparatus of claim 9, wherein the communications are posts to a message board and the destination is the message board.

12. The apparatus of claim 1, wherein the flagging filter scans communications between participants of validated groups and flags communications that include attachments, wherein all flagged communications are sent to the associated person or other monitor for review of the attachments prior to the flagged communications reaching their destination.

13. The apparatus of claim 1, further comprising a log of all communications received by a participant.

14. A method for providing monitored and filtered communication in a shared learning environment, the shared learning environment including a plurality of validated groups that communicate among one another, each of the plurality of validated groups comprising at least one participant, and a person associated with at least one of the validated groups with the associated person having the ability to define the filtration for the participant, the method comprising:

receiving group description data from a candidate group;

validating, at a first filter, the group description data, whereupon the associated candidate group thereby becomes one of the plurality of validated groups; and monitoring and scanning, at a second filter, communications between the plurality of validated groups, the second filter including at least a flagging filter that flags communications between participants in validated groups for further filtration of the content of the flagged communications based, at least in part, on a portion of the group description data and on criteria other than message content and that forwards flagged communications for further inspection based on the filtration defined by the associated person for either the creator of the communication or the viewer of the communication.

15. The method of claim 14, wherein the candidate group comprises a classroom and the at least one participant comprises at least one student, and wherein the group description data includes one or more of an identity of the associated person, a textual description of the classroom, average age of the at least one student, one or more languages spoken by the at least one student, the number of students comprising the at least one student, and a description of the interests of the at least one student.

16. The method of claim 14, wherein the group description data includes identification information regarding the associated person, and wherein validating the received group description data further comprises validating an identity of the associated person.

17. The method of claim 16, wherein validating of the identity of the associated person includes ensuring that the associated person is authorized to represent the participants in the candidate group.

18. The method of claim 14, wherein the flagging filter includes one or more filtering levels at which communications between participants are filtered, and wherein each participant in a validated group is associated with a participant account, the participant account identifying one of the filtering levels at which the flagging filter flags communications associated with a participant associated with the participant account.

19. The method of claim 18, wherein the associated person sets the filtering level for each participant account.

20. The method of claim 14, wherein validating the received group description data further comprises, for each validated group, creating a profile having one or more group characteristics using some or all of the group description data for that group, and searching for another of the plurality of validated groups based on one or more of the one or more group characteristics.

21. The method of claim 14, further comprising scanning, at the flagging filter, communications between participants of validated groups and flagging communications that include words on a master word list associated with the flagging filter.

22. The method of claim 21, further comprising sending all flagged communications to the associated person for review prior to the flagged communications reaching their destination.

23. The method of claim 22, wherein the communications are electronic mail messages and the destination is an inbox of a participant.

24. The method of claim 22, wherein the communications are posts to a message board and the destination is the message board.

25. The method of claim 14, wherein monitoring communications between the plurality of validated groups further comprising:

scanning, at the flagging filter, communications between participants of validated groups;

flagging communications that include attachments; and sending all flagged communications to the associated person or other monitor for review of the attachments prior to the flagged communications reaching their destination.

26. The method of claim 14, further comprising maintaining a log of all communications received by a participant.

* * * * *